Oct. 7, 1941.  S. B. WINN  2,258,432
TRACTOR-TRAILER VEHICLE
Filed July 5, 1940  6 Sheets-Sheet 1
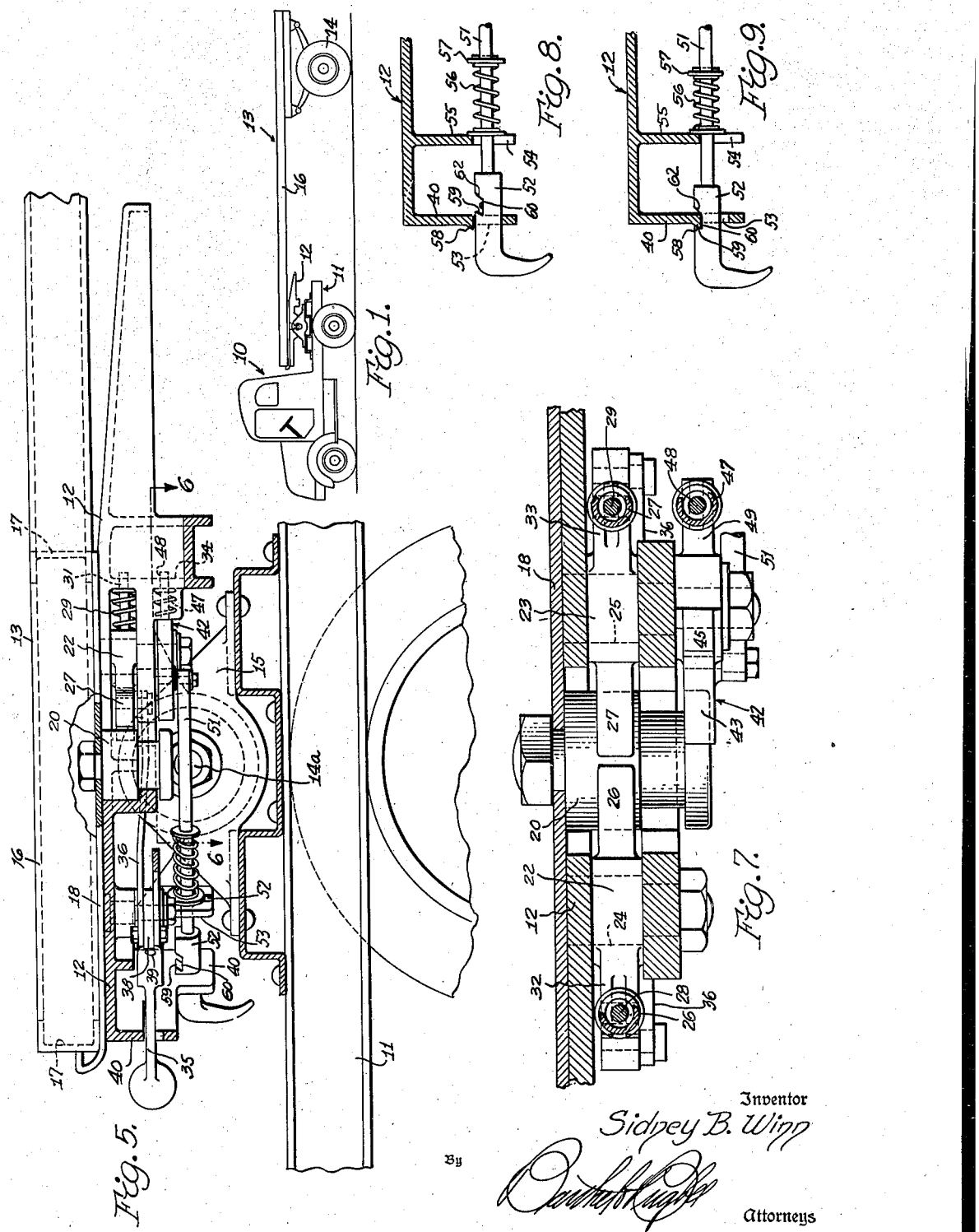

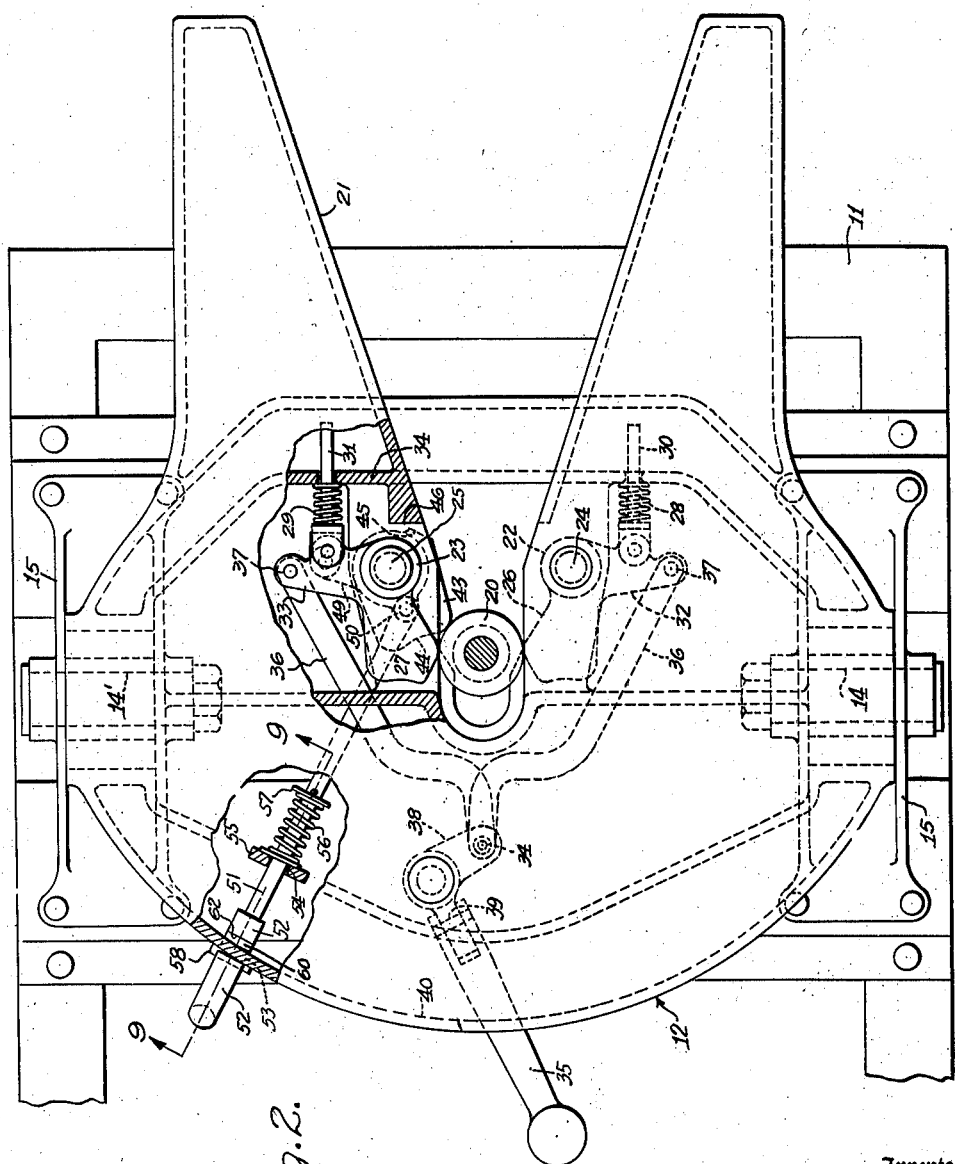

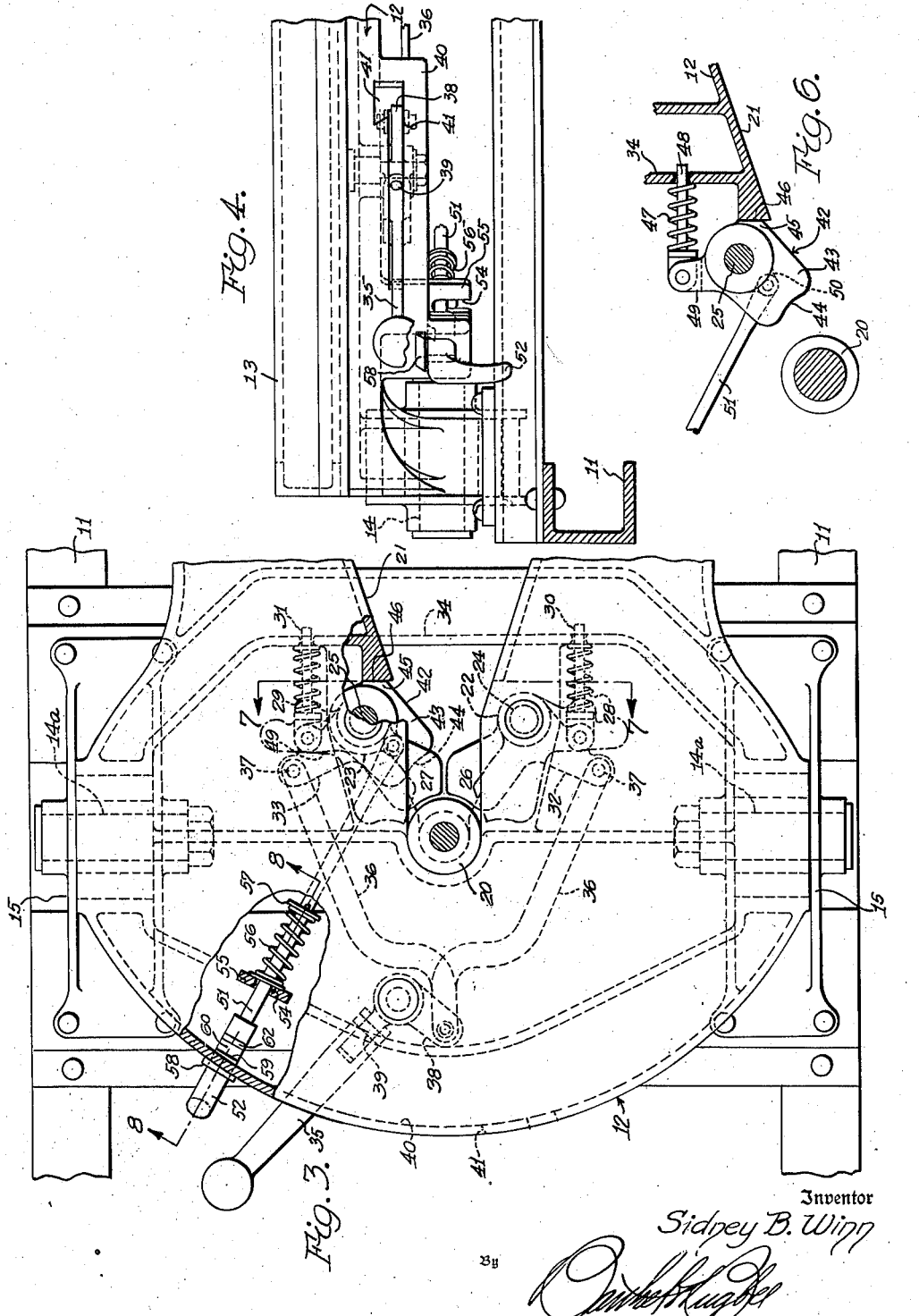

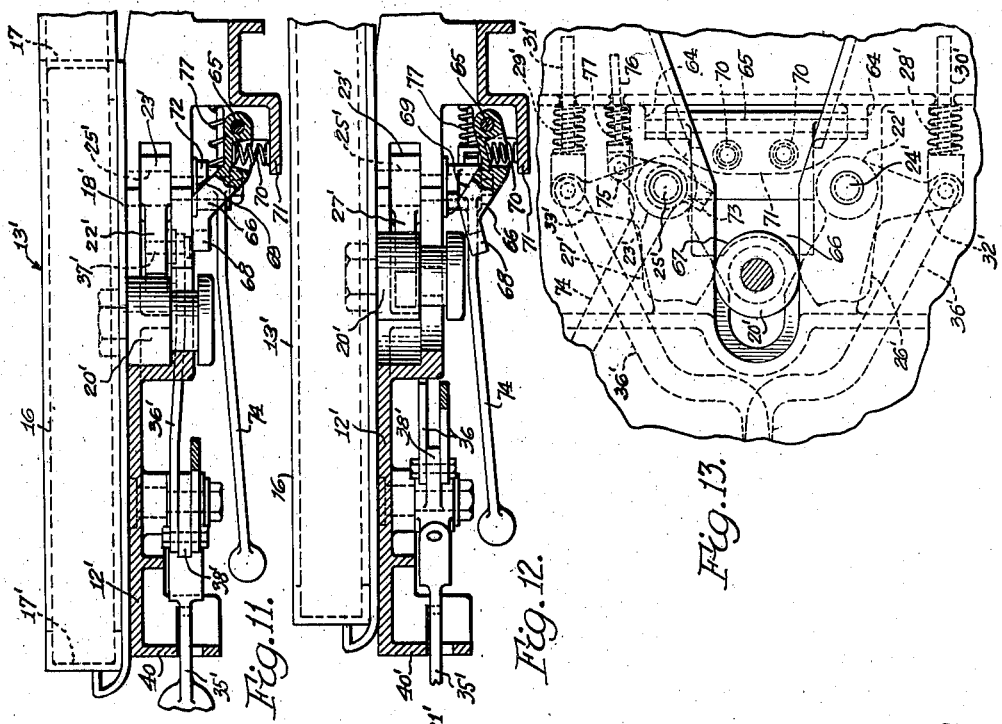
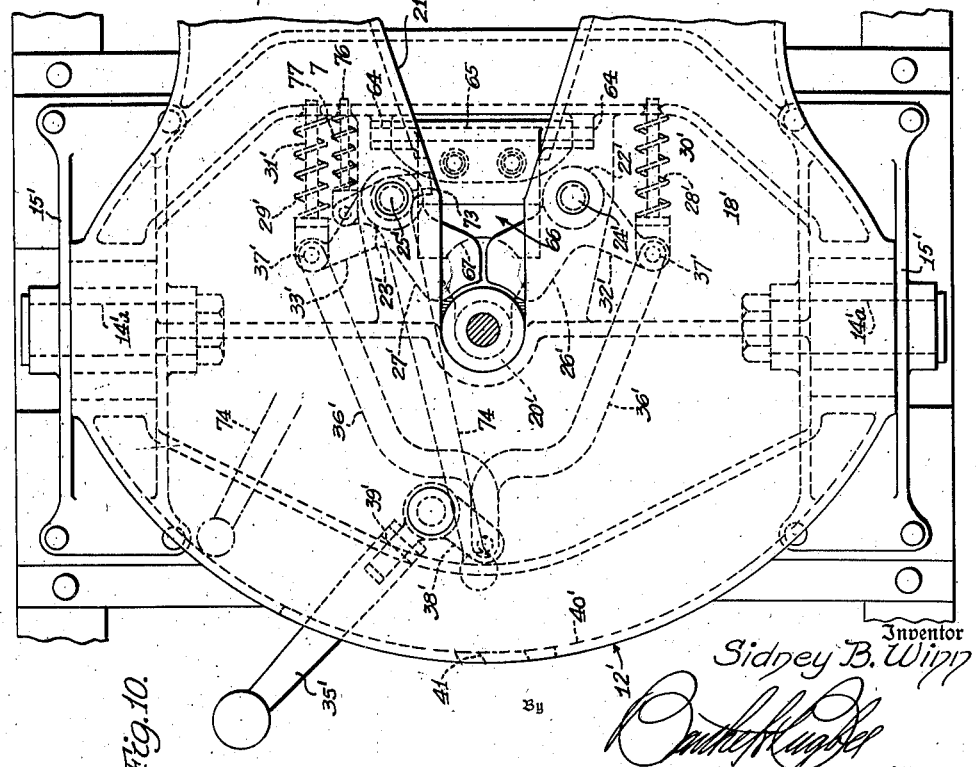

Oct. 7, 1941.  S. B. WINN  2,258,432
TRACTOR-TRAILER VEHICLE
Filed July 5, 1940  6 Sheets-Sheet 5
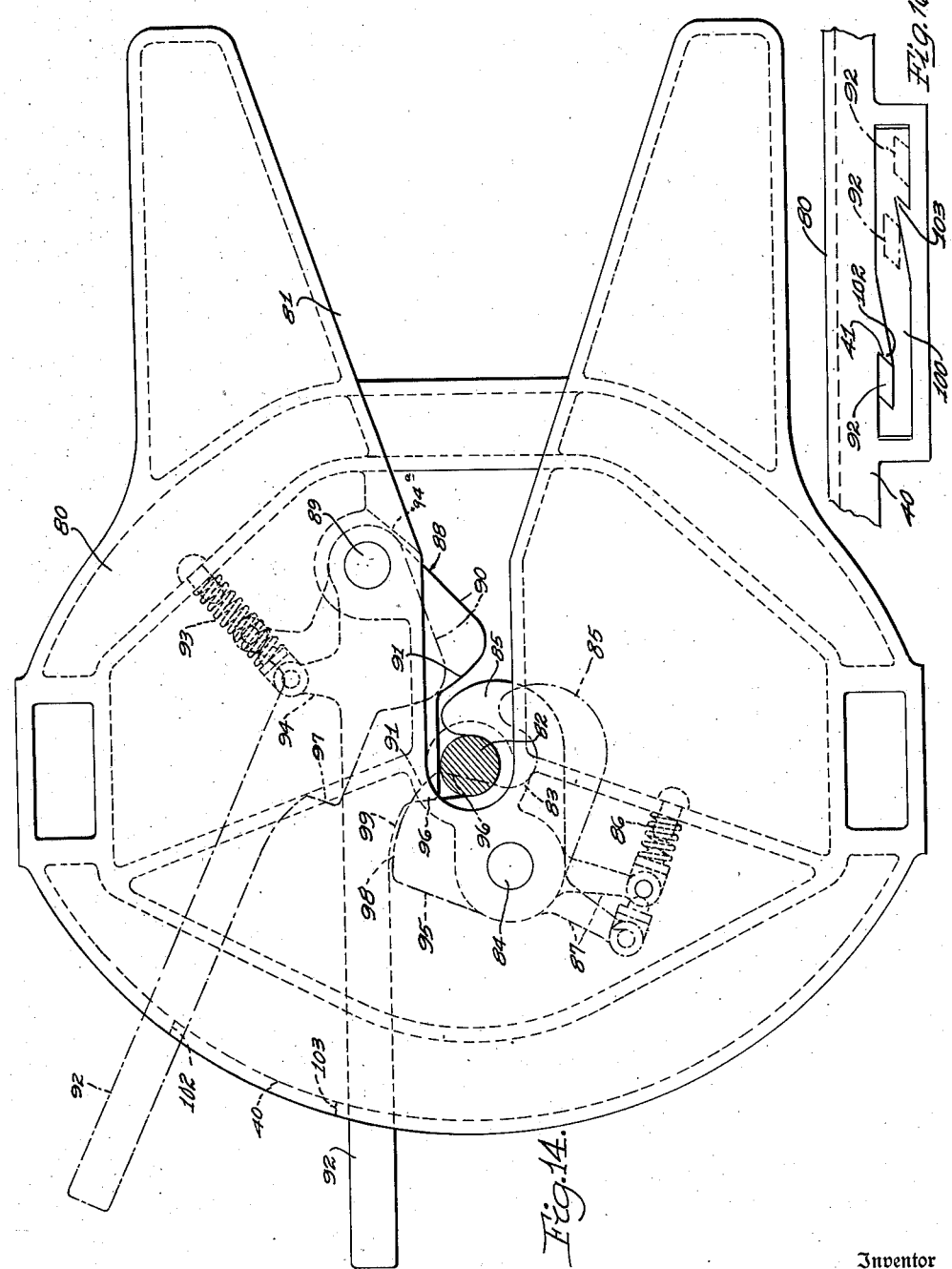
Inventor
Sidney B. Winn
By
Attorneys

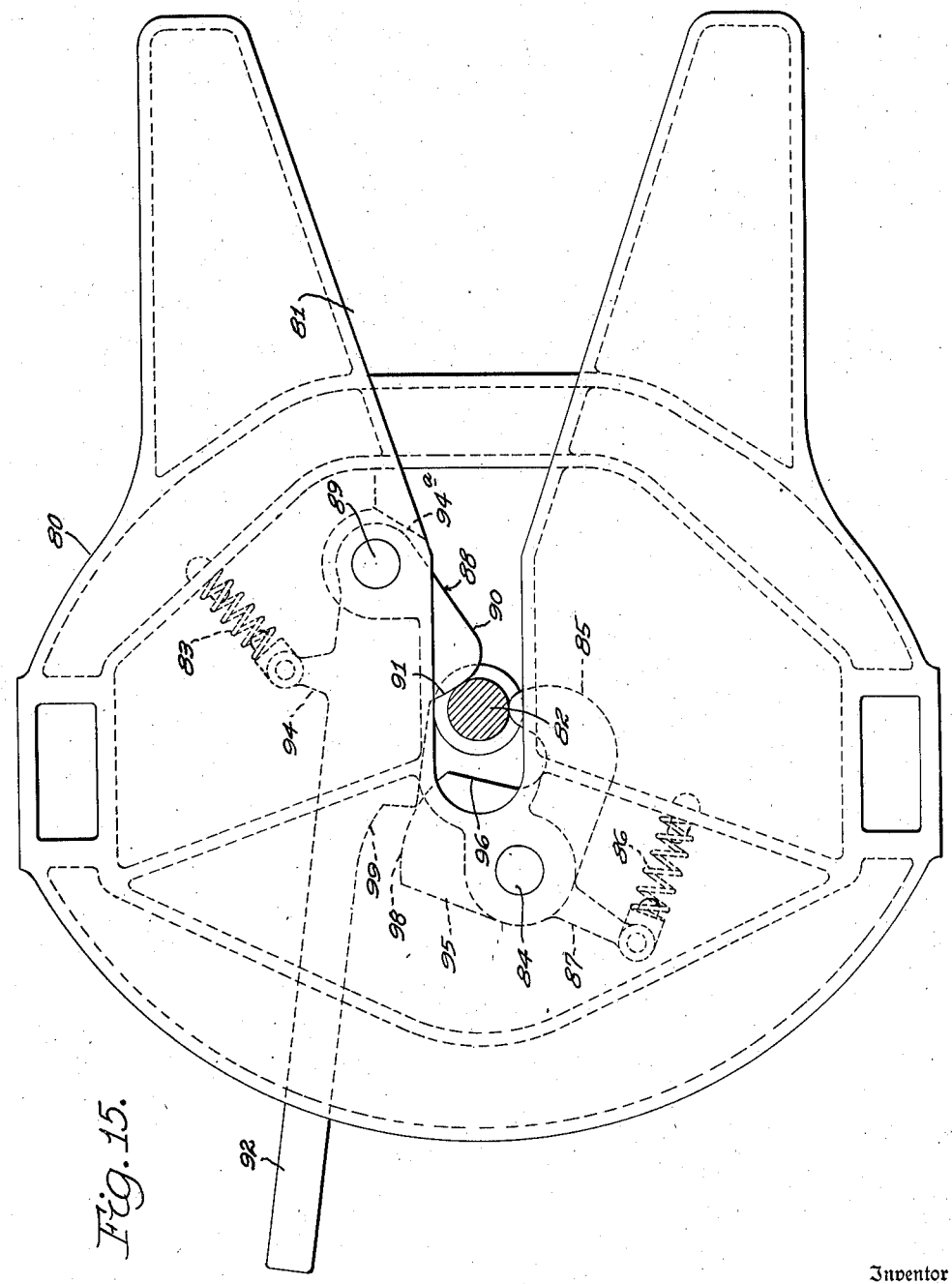

Patented Oct. 7, 1941

2,258,432

UNITED STATES PATENT OFFICE 2,258,432

TRACTOR-TRAILER VEHICLE

Sidney B. Winn, Lapeer, Mich.

Application July 5, 1940, Serial No. 343,917

13 Claims. (Cl. 280—33.1)

This invention relates generally to vehicles and more particularly to tractor-trailer vehicles.

It is an object of the present invention to provide for tractor-trailer vehicles a new and improved safety device for preventing separation of the vehicles if for any reason the coupling mechanism should fail to hold the vehicles together.

Another object of the invention is to provide an auxiliary coupling means for tractor-trailer vehicles for preventing separation of the vehicles if the principal coupling means does not hold the vehicles together.

Another object of the invention is to provide a safety means of the above mentioned character which is automatically released from an inactive to an active position upon separation following intentional uncoupling of the vehicles.

Another object of the invention is to provide a new and improved fifth wheel having combination safety means for preventing accidental separation of a tractor and trailer and for releasably holding main coupling means in coupled position.

A further object of the invention is to provide a safety holding means which automatically positions to prevent separation of tractor-trailer vehicle combinations.

Other objects of the invention will become apparent from the following detailed description taken together with the accompanying drawings in which:

Figure 1 is a side elevational view of a tractor and a trailer shown coupled together;

Fig. 2 is a top plan view of a fifth wheel coupling means having parts broken away and in section to show my improved safety coupling means associated with the fifth wheel;

Fig. 3 is a view similar to Fig. 2 but showing the operating parts in other positions they will assume when the vehicles are coupled together;

Fig. 4 is a fragmentary end view of the fifth wheel looking from left to right of Fig. 3;

Fig. 5 is a fragmentary view of an end portion of a tractor and fifth wheel shown substantially in central longitudinal section and showing a forward portion of a trailer in elevation coupled to the tractor fifth wheel;

Fig. 6 is a fragmentary view of certain detail structure associated with the fifth wheel and taken along the line 6—6 of Fig. 5;

Fig. 7 is a view shown in longitudinal section of the fifth wheel and associated parts taken along the line and in the direction of the arrows 7—7 of Fig. 3;

Fig. 8 is a sectional detail view taken along the line and in the direction of the arrows 8—8 of Fig. 3;

Fig. 9 is a sectional detail view taken along the line and in the direction of the arrows 9—9 of Fig. 2;

Fig. 10 is a top plan view of a fifth wheel coupling means having a modified form of safety or auxiliary coupling means;

Fig. 11 is a fragmentary view showing a forward part of a trailer in side elevation and showing the fifth wheel of Fig. 10 in central longitudinal section with the operating parts shown in the positions they will assume when the vehicles are coupled;

Fig. 12 is a view similar to Fig. 11 showing a stage in the separation of the vehicles;

Fig. 13 is a fragmentary top plan view with the movable parts carried by the fifth wheel in positions corresponding to the positions of the parts shown in Fig. 12;

Fig. 14 is a top plan view of a modified form of my invention;

Fig. 15 is a view similar to Fig. 14 but showing the movable parts of the fifth wheel in other of different position; and Fig. 16 is a detail fragmentary view of a downturned flange of the fifth wheel shown in Fig. 14.

Referring to the drawings by characters of reference and first to Fig. 1, there is shown a tractor 10 having a frame 11 on and adjacent the rear end of which there is mounted a fifth wheel 12 for supporting the front end of a trailer 13, the rear end of the trailer being supported by suitable wheels 14. Preferably, the fifth wheel 12 is tiltable longitudinally of the tractor (a conventional mounting), and to this end the fifth wheel 12 is mounted by aligned horizontal shafts 14ª on transversely spaced, upright brackets 15 which are rigidly secured to the tractor frame 11. The trailer 13 has a frame comprising longitudinal frame members 16 rigidly secured together by transverse frame members 17, and rigidly secured to the underside of a forward end portion of the frame there is a supporting plate 18 which slides up onto and rests on the upper surface of the fifth wheel 12 when the tractor is backed beneath the trailer frame.

Rigidly secured to the supporting plate 18 and depending from the underside thereof there is a king pin 20 which, when the tractor is backed beneath the trailer, enters a substantially V-shaped rearwardly opening slot 21 provided in the fifth wheel 12. The slot 21 extends longitudinally of the fifth wheel 12, between a pair of coupling members 22 and 23 which are respectively pivoted to and beneath the fifth wheel by pins 24 and 25. The coupling members 22 and 23 have arms 26 and 27 respectively which swing out into the slot 21 forming a jaw back of the king pin 20 for cooperation therewith to couple the vehicles together. A pair of helical coil springs 28 and 29 respectively act to swing the coupling members 22 and 23 into the slot 21 or into coupling relation with the king pin 20, which springs are retained by and surround pins 30 and 31 respectively. The pins 30 and 31 have corresponding ends thereof pivoted respectively to arms 32 and 33 of the coupling members 22 and 23, and the pins are slidably received and guided in apertures provided in a depending flange 34 of the fifth wheel 12. A manually operable lever 35 is provided for opening and/or closing the coupling jaws 22 and 23 and is connected to a pair of toggle arms 36 which have corresponding ends thereof pivoted, as at 37, respectively to the jaw member arms 32 and 33. The other corresponding ends of the toggle arms 36 are pivoted together and to one end of an arm 38 of a lever having a second arm 39 to which the hand lever 35 is pivoted for vertical movement. Along its forward edge, the fifth wheel 12 is provided with a downturned flange 40 in which is provided a notch 41 to receive the lever 35 for releasably holding or locking the coupling members or swinging jaws 22 and 23 in spaced apart positions with the jaws projecting slightly into the fifth wheel slot, as shown in dot and dash lines in Fig. 3.

In order to insure that the tractor and trailer will not become separated if for any reason the coupling jaws 22 should release or break, I provide a safety stop, third, or auxiliary jaw 42 which is arranged to move and project into the fifth wheel slot 21 for abutment by the king pin 20. For convenience of manufacture and simplicity of construction, the safety member or auxiliary jaw 42 is pivoted on the coupling member pivot pin 25 beneath the coupling member 23. The safety coupling member 42 is provided with an arm 43, the end of which preferably is provided with a concave surface 44 to receive or for abutment by the king pin 20. Also, the arm 43 is provided with an extended portion 45 having a flattened surface of an extension 46 of the fifth wheel, for limiting movement of the safety or auxiliary jaw 42 in a counterclockwise direction, as seen in Fig. 3. A helical coil spring 47, Figs. 5 and 7, acts to pivot or swing the jaw 42 against the jaw stop 46, in which position the jaw arm 43 projects into the fifth wheel slot 21 to engage the king pin 20 and prevent complete separation of the vehicles in the event of failure of the coupling jaws 22 and 23. The spring 47 is retained by and surrounds a pin 48 which is pivoted at one end thereof to an arm 49 of the jaw 42, the pin 48 being slidably received and guided in an aperture provided in the downturned fifth wheel flange 34. Beneath and spaced from the stop arm or jaw 43, the safety member 42 is provided with another arm 50 to which one end of a manually operable rod 51 is pivotally connected, the other end of the rod 51 being received in and rigidly secured to the shank 52 of a handle. The handle shank 52 is slidably received and guided in an aperture 53 in the forward downturned fifth wheel flange 40, as is more clearly shown in Figs. 8 and 9, and the rod 51 also extends through a slot 54 provided in a downturned fifth wheel flange 55 which is spaced inwardly of the forward downturned flange 40. Surrounding the rod 51 rearwardly of the fifth wheel flange 55, a helical coil spring 56 has one end thereof abutting the flange 55 and the other end thereof engaging an abutment 57 on the rod 51, the spring 56 acting to move the rod 51 inwardly or in a direction aiding the spring 47 to swing the safety coupling member 42 into effective position. As shown in Fig. 8, the fifth wheel flange 40, above the aperture 53 therein, is provided with a forwardly and downwardly extending portion 58 providing a catch on which a latch 59 on the handle shank 52 hooks to hold the rod 51 outwardly against the actions of the springs 56 and 47. The latch is obtained, in the present instance, by the provision of an upwardly facing transverse slot 60 in the handle shank 52. The slot provides spaced, opposed abutment surfaces of which the forwardly disposed abutment surface is angularly disposed complementary to the opposed surface of the catch 58 and constitutes the latch 59. The other abutment surface, formed by the notch 60 and designated by the numeral 62, constitutes an inclined cam surface which is adapted to engage the inner lower edge of the fifth wheel flange 40 to force the rod 51 downwardly, when the rod is moved further forward or outwardly from the position thereof shown in Fig. 9. This cam action disengages the latch 59 from its catch 58 which permits the safety or auxiliary jaw 42 to swing to its effective position, shown in Fig. 3, for example.

Assume that a tractor having the herein described coupling members and safety member is coupled to a trailer having a king pin 20. To uncouple the vehicles, the operator first moves the manually operable lever 35 which is swung in a clockwise direction, facing Fig. 3, moving the toggle arms 36 apart which swings the coupling jaws 22 and 23 to the positions shown in dot and dash lines in Fig. 3, the lever 35 then being raised to lock it to the fifth wheel in the slot 41. The safety or auxiliary jaw 42 is then swung partially out of the way of the king pin 20 or to the position shown in Fig. 2 by pulling the rod 51 outwardly or forwardly and, by lifting upward on the rod handle, the latch or abutment 59 thereof latches with the catch 58 for releasably holding the safety jaw 42 in partially retracted latched position. When the tractor is driven away from the trailer, the king pin 20 engages the ends of the jaws and moves the jaws further apart which permits the lever 35 to swing downwardly out of the notch 41, thus releasing the jaws so that they can return to their normal positions, or in coupling position. Also, upon separation of the vehicles, the rounded corner of the safety jaw arm 43, projecting slightly into the fifth wheel slot 21, engages the king pin 20 which swings the safety jaw 42 further out of the slot 21, during which movement the king pin 20 passes by the safety jaw 42 and the rod 51 is moved further outwardly or forwardly. This movement of the rod 51 results in the inclined cam surface 62 moving against the lower rear edge of the fifth wheel flange 40, see Fig. 9, which causes the outer end of the rod 51 to be moved downwardly and to be disengaged from the catch 58, after which the springs 47 and 56 are free to swing the safety jaw 42 back into the fifth wheel slot 21. On coupling of the vehicles the tractor is backed beneath the forward end of the trailer, the fifth wheel 12 receiving the trailer king pin 20 in the V-slot 21 thereof. As this takes place, the safety jaw 42 engages the king pin 20 which swings the jaw 42 outwardly of the slot 21 to pass by the safety jaw 42, after which the jaw is swung back into its effective position, shown in Fig. 2, by the springs 47 and 56. Also, the king pin 20 engages and pivots the coupling jaws 22, 23 out of the way and, after the king pin is in position in the end of the V-slot 21, the jaws swing back into coupling position under action of the springs 28 and 29. It will now be seen that, if for any reason the coupling members 22 and 23 should become released or otherwise fail, the safety coupling member 42 will be in position to prevent complete separation of the vehicles and thus avoid falling of the forward end of the trailer.

Referring now to the modification shown in Figs. 10 to 13 inclusive, since the fifth wheel and the main coupling means thereon are the same as those previously described, these various parts are given prime numerals to avoid unnecessary repetition of description. Mounted in apertured lugs 64 of and below the fifth wheel 12' a horizontal shaft 65, immediately below and extending transversely of the fifth wheel king pin receiving slot 21', pivotally supports a plate-like, retractable safety member or auxiliary jaw 66 having in its forward edge a socket 67 to receive the king pin 20' for preventing separation of the tractor and the trailer in the event of failure of the coupling members 22' and 23'. A forward portion 68 of the safety stop member 66 is offset upwardly and joins the rearward portion by an inclined portion 68ª, the upper surface 69 of which constitutes a cam, provided for a purpose hereinafter described. The safety stop 66 is provided with a pair of downwardly facing sockets to receive and retain respectively the upper ends of a pair of helical coil springs 70 which seat at their lower ends on a horizontal flange 71 of the fifth wheel 12'. The springs 70 act to swing the safety member or auxiliary jaw 66 upwardly to a position against the underside of the fifth wheel as a stop in which position the socket 67 of the member 66 is in position to receive the king pin 20 in the event the coupling members 22' and 23' should break or release. Mounted on the coupling member shaft 25' and below the coupling member 23' there is provided a swinging operating member 72 having an arm 73 for engaging and depressing the safety jaw member 66 to the position shown in Fig. 12 to permit the jaw member 66 to pass beneath the king pin 20' upon intended separation of the tractor and trailer, the operating member 72 being provided with a lever 74 for manually operating the same. The operating member 72 is provided with an arm 75 to which is pivotally connected one end of a horizontal guide or retainer pin 76 which is slidably received and guided beneath the fifth wheel 12' in an aperture provided in the downturned flange 40' of the fifth wheel. Surrounding the pin 76 there is a helical coil spring 77 which acts to pivot the operating member 66 in a counterclockwise direction to release the safety jaw member 66 and permit the spring 70 to swing the jaw up to the position shown in Fig. 11.

Fig. 10 shows the coupling members 22' and 23' in coupling relation with the king pin 20' and shows the safety stop member 66 in its raised or effective position to engage the king pin in the event of failure of the coupling members 22' and 23'. The positions of the coupling and safety members in Fig. 11 correspond to those of Fig. 10. To uncouple the vehicles, the operator, by means of the lever 35', swings the coupling members 22' and 23' partly out of the king pin slot and raises the lever 35' to lock it in the notch 41'. Then by swinging the lever 74 to the dot and dash position shown in Fig. 10, the operating member 72 is pivoted in a clockwise direction. When the operating member 72 is pivoted in a clockwise direction, its arm 73 engages the inclined cam surface 69 of the safety member 66 and pivots it downwardly to and frictionally holds it in the position shown in Fig. 12 and also holds the springs 70 under compression. In this position of the safety member 66, it will be noted that the upper surface of the forward portion thereof is inclined and is in position for engagement by the lower edge of the king pin 20' when the vehicles are separated. Upon intentional separation of the vehicles, as the tractor pulls away from the trailer, the safety member 66 is moved further downwardly by the king pin 20' engaging therewith which permits the king pin to pass by the safety member 66 after which the safety member 66 is swung upwardly to the position shown in Fig. 11 by the springs 70. Upon disengagement of the king pin from the safety member, the operating member 72 is pivoted by the spring 77 in a counter-clockwise direction, facing Fig. 10, which permits the springs 70 to swing the safety member 66 upwardly to the position shown in Fig. 11. Upon coupling of the tractor and trailer the cam surface 69 of the safety member 66 engages the lower edge of the king pin 20' and is depressed thereby to permit the king pin to pass to the end of the V-slot where it is coupled to the fifth wheel by the coupling members 22' and 23' which are moved inwardly to effective coupling positions by means of the springs 28' and 29', the coupling of the vehicles being automatic as previously described in connection with the first-described fifth wheel. After the king pin 20' depresses and disengages from the safety member 66, the member 66 is swung upwardly by the springs 70 to the position shown in Fig. 11 in which position the safety member is in effective position to prevent separation of the vehicles, if for any reason the coupling members 22' and 23' should release the king pin.

Referring now to the modification shown in Figs. 14, 15 and 16, the fifth wheel shown is similar to the previously described fifth wheels and comprises a supporting plate 80 having a tapered guide slot 81 which directs or guides a king pin 82 into a straight sided continuation of the slot when the tractor is backed beneath the trailer. A single coupling member, designated generally by the numeral 83, is pivoted by a pin 84 to the fifth wheel 80 below the upper surface thereof for swinging movement about an axis substantially perpendicular to the upper surface of the plate. As shown, the coupling member 83 is provided with a hook-like jaw 85 which is adapted to hook around or back of the king pin 82 to couple the king pin releasably to the fifth wheel plate 80. A helical coil spring 86 acting against an arm 87 of the coupling member 83 is adapted to hold the coupling member in the uncoupled position shown in the dot and dash lines, Fig. 14.

A second or safety coupling jaw 88 is provided on the fifth wheel plate 80 for abutting the king pin 82 to prevent complete separation of the vehicles if, for any reason, the normal or main coupling member 83 becomes broken and releases the king pin 82 or if coupling between member 83 and the king pin is not positively established.

In addition to serving as a safety means to prevent complete accidental separation of a tractor and trailer, the safety member or jaw 88 also serves for releasably locking the coupling member 83 in coupled position with respect to the king pin. The safety jaw or abutment member 84 is disposed rearwardly of the coupling member 83 and is pivoted by a pin 89 for horizontal swinging movement below the upper surface of the fifth wheel plate 80 about an axis substantially perpendicular thereto. As shown, the safety jaw 88 is provided with an extended arm member 90 for projecting into the fifth wheel slot in back of the king pin 82 and the forward edge or surface of the member 90 is preferably rounded or convex, as at 91. An integral, manually operable lever 92 is provided for the safety jaw 90, which lever extends forwardly of the fifth wheel therebeneath and through a slot 100 provided in the downturned flange 40 of the fifth wheel plate 80, see Fig. 16. Formed integral with the flange 40 there is a pair of spaced oppositely directed abutments 102 and 103 which serve as retaining catches for the manually operable handle 92. The handle 92 is flexible so that it can be sprung upwardly slightly to engage back of the catch 102. The spring 93, aided by the engaging inclined surfaces of the handle 92 and catch 102 holds the handle up in its latched position. When the handle 92 is being held back of the catch 102, the safety member 90 projects slightly into the fifth wheel slot in position for abutment by the king pin which, upon separation of the vehicles, engages the safety jaw rounded surface 91 to move the safety member 90 to a position where its handle 92 will be away from the catch and be free to flex downwardly out of engagement with the catch 102. When this occurs, the helical coil spring 93, acting against an arm 94 of the lever 92, swings the safety member 88 counterclockwise, facing Fig. 14, which action takes place during separation of the vehicles, movement of the safety member being limited by its engagement with a rounded end 98 of an arm 95 of the coupling member 83. One side edge 96 of the coupling member arm 95 serves as an abutment surface adapted to be engaged by an abutment shoulder 97 provided on the lever 92 adjacent the safety jaw 88. When the safety jaw 88 is in its normal effective position or position holding the coupling member in coupled position with respect to the king pin, the abutment shoulder 97 positions rearwardly of the arm 95 in abutment with the surface 96 thereby to prevent movement of the coupling member 83 toward uncoupled position. The arm 95 is preferably rounded at its end 98 to conform to a recess 99 provided on the lever 92 and in which the end of the arm engages.

In uncoupling the vehicles, the driver or operator swings the handle or lever 92 manually to the position shown in dot and dash lines and, by lifting up on the handle, latches it behind the catch 102, Fig. 16. In this position of the lever 92, the safety jaw 88 has been retracted partially from the fifth wheel slot leaving a rounded end portion of the member 90 projecting into the slot for engagement by the king pin 42 when the tractor pulls away from the trailer. During separation of the vehicles, when the king pin and safety member portion 90 engage, the lever 92 is pivoted in a clockwise direction until the king pin is clear of the safety jaw and the lever 92 moves out of its retaining notch or catch 102 and flexes down which leaves the lever free to be returned to its effective position by the spring 93. However, prior to the return of the lever 92 to its effective position or during unlatching of the safety jaw handle, the king pin 82 swings the coupling member 83 to its uncoupled position shown in dot and dash lines in which position it is yieldingly held by the spring 86.

In coupling the vehicles, the king pin 82 engages the safety jaw extended arm 90 and pivots the jaw in a clockwise direction, facing Fig. 14, to pass the jaw after which the jaw is swung back by the spring 93 to its effective position or position shown in full and dotted lines, Fig. 14. After the king pin 82 has passed the jaw 90, the king pin engages the surface 96 of the coupling member arm 95 and pivots the coupling member, swinging the jaw 85 thereof around in back of the king pin to the effective or coupled position, coupling the king pin to the fifth wheel. During the swinging movement of the coupling jaw 83 by the king pin 82 the lever 92 rides on the rounded outer end of the coupling member arm 95 under the action of the spring 93 which, after the coupling member 83 is in coupled position, holds the lever abutment surface 97 against the arm abutment surface 96. In this position, the safety jaw handle is disposed behind the catch 103 which limits movement of the handle in a clockwise direction which might otherwise occur due to shocks and vibrations and release the coupling member 83. Thus, it will be seen that when the safety jaw 88 is in its effective position or position in which it will serve to prevent complete separation of a tractor from a trailer, the abutment or stop member 97 abuts with the safety member abutment surface 96 to hold releasably the normal or main coupling member 83 in coupled position.

In the event that coupling isn't completed when the tractor is backed beneath the trailer or if the coupling jaw 85 should break, the safety jaw 88 will serve to prevent complete separation of the vehicles. As illustrated in Fig. 15, when accidental uncoupling occurs, the rounded end 91 of the coupling member 83 will engage the safety member 88 adjacent the abutment or shoulder 97 and will slightly pivot the safety member in a clockwise direction or until the king pin engages the rounded end 91 of the safety member 88, tending to pivot the safety member in a counterclockwise direction effecting a wedging action therewith. Thus, the king pin lodges against the safety member between the safety member and the end of the hooked jaw and keeps the safety member from moving out of the fifth wheel slot and as a result complete separation of the vehicle is avoided.

While I have shown and described my invention in detail, it is to be understood that the same is to be limited only by the appended claims for many changes may be made without departing from the spirit and scope of the invention.

What I claim is:

1. In tractor-trailer vehicles, coupling means on one of said vehicles, coupling means on the other of the vehicles and cooperable with said first-named coupling means for releasably coupling the vehicles together, movable safety coupling means cooperable with one of said coupling means to prevent separation of the vehicles in the event of failure of the cooperable coupling means, yieldable means operable to move said safety means to an effective position for cooperation with said one coupling means, manually operable means to move said safety means in an opposite direction in position for further movement thereof in said opposite direction by said one coupling means, and means releasable by and upon still further movement of said safety member in said opposite direction for releasing said yieldable means.

2. In tractor-trailer vehicles to be releasably coupled together, coupling means carried by one of the vehicles, a king pin carried by the other of said vehicles and cooperable with said coupling means for releasably coupling the tractor and trailer together, a swinging safety stop member movable in one direction to a position for cooperation with said king pin to prevent separation of the vehicles in the event of failure of said coupling means, abutment means limiting movement of said swinging stop member in said one direction to prevent movement thereof past said position, spring means operable to move said stop member to said position, manually operable means for swinging said stop member in the opposite direction to an intermediate position between the limits of movement thereof, said stop member in said intermediate position being arranged for further movement in said opposite direction by said king pin upon separation of the vehicles, and means for holding said stop member in said intermediate position and releasable by the said further movement of said stop member.

3. In a fifth wheel having a slot to receive a king pin and having coupling means cooperable with the king pin to couple two vehicles releasably together, a safety mechanism for preventing complete separation of the vehicle in the event of failure of said coupling means comprising, a swinging stop member movable in one direction to a position for abutment with said king pin to limit movement of the king pin relative to the fifth wheel, spring means acting to move said stop member in said one direction, stop means limiting movement of said stop member in said one direction to said position, manually operable means for moving said stop member in the opposite direction to an intermediate position between the limits of swinging movement of said stop member, said stop member in said intermediate position being arranged for further movement in said opposite direction by said king pin when the vehicles are being intentionally separated, and latch means holding said stop means in said intermediate position and releasable by said further movement of said stop member.

4. In a fifth wheel having a slot to receive a king pin and having coupling means cooperable with said king pin to couple two vehicles together, a pivoted stop member on said fifth wheel and movable in one direction by the king pin upon movement of the vehicles together, spring means operable to move said stop member in the opposite direction to a position for abutment with the king pin to limit separation movement of the vehicles in the event of failure of the coupling means, manually operable means for moving said stop member to a position intermediate the limits of movement thereof, said stop member in said intermediate position being arranged for movement in said one direction by and out of the way of the king pin upon intentional separation of the vehicles, and cooperable latch means on said manually operable means and on the fifth wheel for releasably holding said stop member in said intermediate position and releasable by said stop member upon movement thereof from said intermediate position by said king pin.

5. In a fifth wheel having a slot to receive a king pin and having coupling means cooperable with the king pin for releasably coupling two vehicles together, a pivoted stop member on the fifth wheel and having an effective position for abutment with the king pin to prevent complete separation of the vehicles in the event of failure of said coupling means and having an ineffective position, a manually operable lever for moving said stop member to a position intermediate said effective and ineffective position, said stop member in said intermediate position being arranged for movement by the king pin, said lever having a notch to receive a catch on said fifth wheel for releasably holding said stop member in said intermediate position, and cam means on said lever and cooperable with the fifth wheel for releasing said lever when said stop member is pivoted in one direction from said intermediate position.

6. In tractor-trailer vehicles, a fifth wheel on one of the vehicles and having a slot to receive a king pin on the other of the vehicles, coupling means carried by said fifth wheel and cooperable with said king pin for releasably coupling the vehicles together, a stop member pivoted to said fifth wheel and movable in one direction to a position for engagement with said king pin to prevent complete separation of the vehicles in the event of failure of said coupling means, said stop member having a position intermediate the limits of movement thereof for abutment and movement by and out of the way of said king pin upon intentional separation of the vehicles, spring means for moving said stop member to its effective position, a manually operable member movable to a position for frictionally holding said stop member in said intermediate position, and spring means acting to move said manually operable member in one direction.

7. In a fifth wheel for coupling a tractor and a trailer together, a supporting member carried by one of the vehicles and having a slot to receive a king pin carried by the other of the vehicles, coupling means carried by said supporting member, means automatically operable to move said coupling means into coupling relation with the king pin, releasable holding means for said coupling means, manually operable means for positioning said coupling means in an intermediate position for movement by the king pin out of the slot on separation of the vehicles, and means releasably positioned in said slot for releasably holding said coupling means in said intermediate position and releasable by and upon movement of said coupling means from said intermediate position by the king pin, said last named means preventing complete separation of the vehicles in the event of failure of said coupling means.

8. In a fifth wheel for a vehicle, a supporting plate having a slot to receive a king pin carried by another vehicle, coupling means carried by said plate, said coupling means being movable from an ineffective to an effective position to cooperate with said king pin for releasably coupling the vehicles together, safety stop means carried by said plate member, said safety stop means being movable from an ineffective position into said slot to an effective position in the path of the king pin, and means carried by said safety stop means and cooperable with means carried by said coupling means for releasably locking the coupling means in coupled position when said safety stop means is in its effective position.

9. In a fifth wheel for a vehicle, a supporting plate having a slot to receive a king pin carried by another vehicle, coupling means carried by said plate, said coupling means being movable from an ineffective position to an effective position to cooperate with the king pin to couple the vehicles together, a manually operable member having safety means and having an abutment, said member being movable to position said safety means in the slot to prevent complete separation of the vehicles in the event of failure of said coupling means, said coupling means having an abutment cooperable with said first-named abutment when said coupling means is in coupled position to prevent movement of said coupling means from the coupled position.

10. In tractor-trailer vehicle combinations, a king pin on one of the vehicles, a fifth wheel on the other of the vehicles and having a slot to receive the king pin, coupling means on said fifth wheel and cooperable with said king pin, said coupling means being movable into coupled relation with said king pin, and safety means projecting into the fifth wheel slot rearwardly of the king pin and also being operable for releasably holding said coupling means in coupled relation with said king pin.

11. In tractor-trailer vehicle combinations, a king pin on one of the vehicles, a fifth wheel on the other of the vehicles and having a slot to receive the king pin, coupling means carried by said fifth wheel and cooperable with said king pin to couple the vehicles together, said coupling means being movable into and out of coupling relation with said king pin, movable means mounted on said fifth wheel and operable in one position to hold said coupling means in coupled relation with said king pin, said movable means projecting into said fifth wheel slot for engagement with the king pin to prevent complete separation of the vehicles, and yieldable means urging said movable means toward said position.

12. In tractor-trailer vehicle combinations, a king pin on one of the vehicles, a fifth wheel on the other of the vehicles and having a slot to receive the king pin, coupling means carried by said fifth wheel and movable into and out of coupling relation with the king pin, safety coupling means carried by said fifth wheel and releasably positioned in the slot, said safety means being operable for releasably holding said coupling means in coupling relation with said king pin and for preventing complete separation of the vehicles in the event of release of the coupling means, and means operable to move said safety means to release said coupling means.

13. In tractor-trailer vehicle combinations, a king pin carried by one of the vehicles, a fifth wheel carried by the other of the vehicles and having a slot to receive the king pin, a single coupling jaw pivoted to said fifth wheel, said jaw being movable by the king pin into and out of coupling relation therewith, a safety jaw member pivoted to said fifth wheel for projection into said slot to prevent complete separation of the vehicles in the event of failure of said first-named coupling jaw, means on said safety jaw member to hold releasably said first-named jaw member in coupled relation with said king pin, a manually operable handle for said safety jaw and operable to move said safety jaw to release said first-named jaw, and latch means on said fifth wheel for said handle to hold said safety jaw member in effective position holding said first-named jaw in coupled relation with said king pin and to hold said safety jaw in an ineffective position releasable by said king pin.

SIDNEY B. WINN.